(12) United States Patent
Ohshitanai

(10) Patent No.: US 11,765,485 B2
(45) Date of Patent: Sep. 19, 2023

(54) PHOTOELECTRIC CONVERSION APPARATUS, IMAGE CAPTURING APPARATUS, EQUIPMENT, AND METHOD OF DRIVING PHOTOELECTRIC CONVERSION APPARATUS

(71) Applicant: CANON KABUSHIKI KAISHA, Tokyo (JP)

(72) Inventor: Kazuki Ohshitanai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/876,773

(22) Filed: Jul. 29, 2022

(65) Prior Publication Data

US 2023/0042825 A1 Feb. 9, 2023

(30) Foreign Application Priority Data

Aug. 5, 2021 (JP) ................................. 2021-129213

(51) Int. Cl.
*H04N 25/77* (2023.01)
*H04N 25/74* (2023.01)
*H04N 25/75* (2023.01)
*H04N 25/709* (2023.01)
*H04N 25/65* (2023.01)

(52) U.S. Cl.
CPC ........... *H04N 25/77* (2023.01); *H04N 25/709* (2023.01); *H04N 25/74* (2023.01); *H04N 25/75* (2023.01); *H04N 25/65* (2023.01)

(58) Field of Classification Search
CPC ...... H04N 25/77; H04N 25/74; H04N 25/709; H04N 25/75; H04N 25/65; H04N 25/40; H04N 25/46; H04N 25/704; H04N 25/778

See application file for complete search history.

(56) References Cited

U.S. PATENT DOCUMENTS

| | | | |
|---|---|---|---|
| 9,232,164 B2 | 1/2016 | Minowa et al. | |
| 9,456,141 B2 * | 5/2016 | Yamazaki | H04N 25/75 |
| 9,426,391 B2 | 8/2016 | Takada et al. | |
| 9,426,398 B2 | 8/2016 | Ohshitanai | |
| 9,554,068 B2 | 1/2017 | Ohshitanai | |
| 9,627,423 B2 | 4/2017 | Takada et al. | |
| 9,769,404 B2 | 9/2017 | Ohshitanai | |
| 11,539,907 B2 * | 12/2022 | Ikedo | H04N 25/76 |
| 2013/0087875 A1 * | 4/2013 | Kobayashi | H01L 27/14641 257/432 |

(Continued)

FOREIGN PATENT DOCUMENTS

| | | |
|---|---|---|
| JP | 2016-092595 A | 5/2016 |
| JP | 2017-204737 A | 11/2017 |
| JP | 2020-205646 A | 12/2020 |

*Primary Examiner* — Marly S Camargo
(74) *Attorney, Agent, or Firm* — Venable LLP

(57) ABSTRACT

A photoelectric conversion apparatus includes a driving unit and a plurality of pixels. The pixel includes a first photoelectric conversion unit, a second photoelectric conversion unit, a charge-voltage conversion unit, a first transfer transistor, a second transfer transistor, a reset transistor, a microlens configured to condense incident light to the first photoelectric conversion unit and the second photoelectric conversion unit, and an output unit. The driving unit performs a first operation including a first reset operation and a first readout operation, and a second operation including a second reset operation and a second readout operation.

18 Claims, 11 Drawing Sheets

(56) References Cited

U.S. PATENT DOCUMENTS

| | | | |
|---|---|---|---|
| 2015/0281610 A1 | 10/2015 | Ota et al. | |
| 2016/0087875 A1* | 1/2016 | Endo | H04N 25/75 |
| | | | 348/296 |
| 2016/0127669 A1 | 5/2016 | Yamazaki | |
| 2017/0155863 A1* | 6/2017 | Shishina | H04N 25/70 |
| 2017/0214873 A1 | 7/2017 | Nishimura | |
| 2021/0185251 A1* | 6/2021 | Yonemoto | H04N 25/59 |
| 2021/0344868 A1* | 11/2021 | Iwata | H04N 23/50 |
| 2022/0123033 A1* | 4/2022 | Park | H04N 25/778 |

* cited by examiner

PHOTOELECTRIC CONVERSION APPARATUS, IMAGE CAPTURING APPARATUS, EQUIPMENT, AND METHOD OF DRIVING PHOTOELECTRIC CONVERSION APPARATUS

BACKGROUND OF THE INVENTION

Field of the Invention

The present invention relates to a photoelectric conversion apparatus, an image capturing apparatus, an equipment, and a method of driving a photoelectric conversion apparatus.

Description of the Related Art

There are photoelectric conversion apparatuses that perform focus detection by pupil division. Photoelectric conversion apparatuses of this type can perform focus detection by using a set of photoelectric conversion units. Some photoelectric conversion apparatuses of this type perform an operation of outputting a focus detection signal for focus detection and an image signal for image capturing, and an operation of outputting only an image signal for image capturing. Japanese Patent Laid-Open No. 2016-92595 (hereafter PTL 1) describes an image capturing apparatus having an area where a focus detection signal and an image signal are read out respectively, and an area where only an image signal is read out. In this apparatus, a transfer transistor configured to transfer charges to a charge-voltage conversion unit is operated under the same conditions both when transferring charges of a focus detection signal and image signal to the charge-voltage conversion unit and when transferring charges of an image signal to the charge-voltage conversion unit. In PTL 1, the characteristics of the image signal are improved by this method.

However, according to the method disclosed in PTL 1, characteristics appearing in the image signal may differ owing to a difference between the operation of outputting a focus detection signal for focus detection and an image signal for image capturing, and the operation of outputting only an image signal.

SUMMARY OF THE INVENTION

The present invention has been made in consideration of the above situation, and provides a technique advantageous to improve the image quality of an image signal.

According to one aspect of the present invention, there is provided a photoelectric conversion apparatus comprising a driving unit and a plurality of pixels, each pixel including a first photoelectric conversion unit, a second photoelectric conversion unit, a charge-voltage conversion unit, a first transfer transistor provided between the first photoelectric conversion unit and the charge-voltage conversion unit, a second transfer transistor provided between the second photoelectric conversion unit and the charge-voltage conversion unit, a reset transistor provided between the charge-voltage conversion unit and a power supply voltage terminal, a microlens configured to condense incident light to the first photoelectric conversion unit and the second photoelectric conversion unit, and an output unit configured to output a signal corresponding to a voltage of the charge-voltage conversion unit, wherein the driving unit performs a first operation including a first reset operation of turning on the reset transistor, the first transfer transistor, and the second transfer transistor and then turning off the reset transistor, the first transfer transistor, and the second transfer transistor, and a first readout operation of, after the first reset operation, turning on the first transfer transistor and the second transfer transistor and outputting the signal corresponding to the voltage of the charge-voltage conversion unit from the output unit, and the driving unit performs a second operation including a second reset operation of turning on the reset transistor and the first transfer transistor and then turning off the reset transistor and the first transfer transistor, a third reset operation of turning on the reset transistor, the first transfer transistor, and the second transfer transistor and then turning off the reset transistor, the first transfer transistor, and the second transfer transistor, and a second readout operation of, after the third reset operation, turning on the first transfer transistor, outputting the signal corresponding to the voltage of the charge-voltage conversion unit from the output unit, turning on the first transfer transistor and the second transfer transistor in a state in which the charge-voltage conversion unit holds charges, and outputting the signal corresponding to the voltage of the charge-voltage conversion unit from the output unit.

Further features of the present invention will become apparent from the following description of exemplary embodiments with reference to the attached drawings.

DESCRIPTION OF THE EMBODIMENTS

Figure 1:
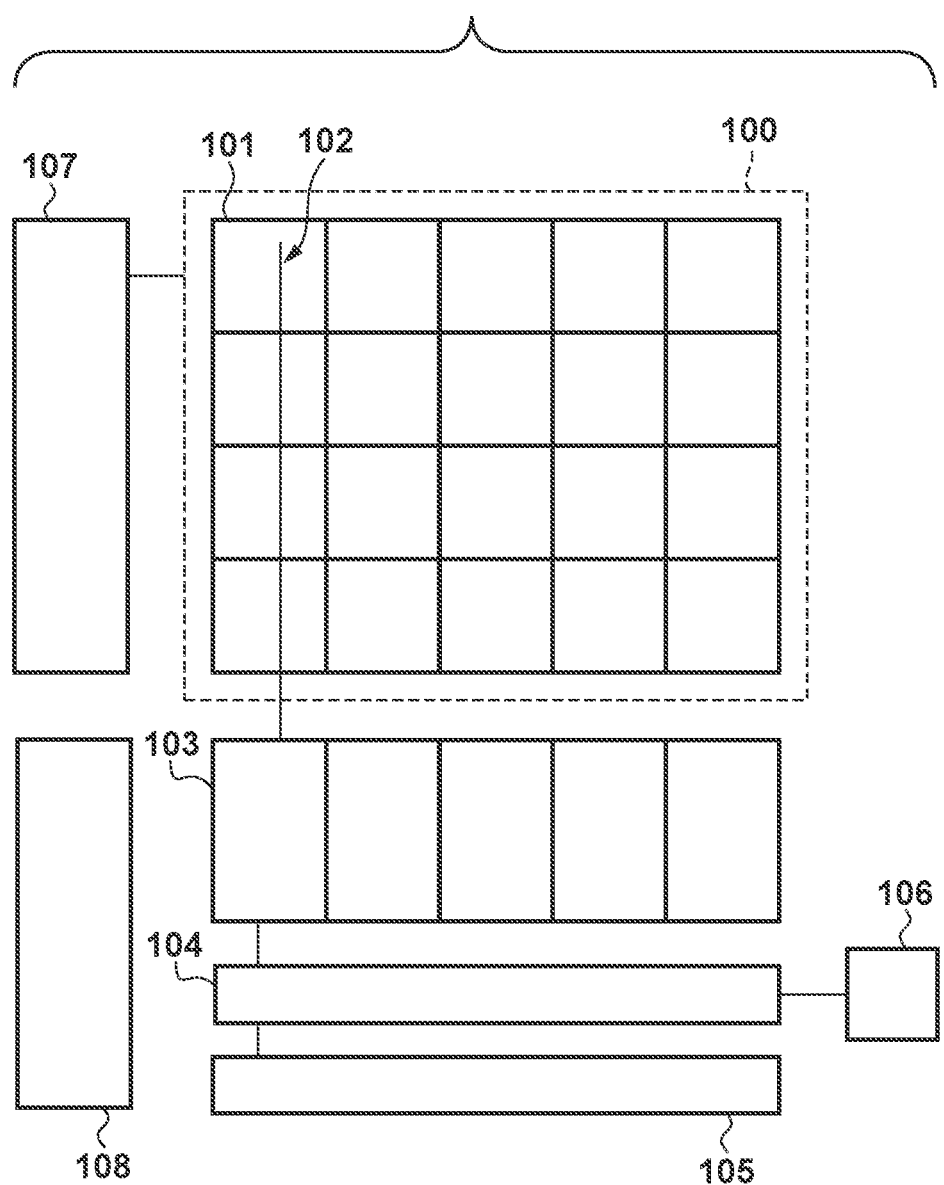
FIG. 1 is a view showing an example of the arrangement of an image capturing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In each embodiment to be described below, an image capturing apparatus will be mainly explained as an example of a photoelectric conversion apparatus. However, the embodiments are not limited to the image capturing apparatus and are also applicable to another example in which a photoelectric conversion apparatus is used. For example, the embodiments are applicable to a distance measurement apparatus (apparatus for distance measurement or the like using focus detection or TOF (Time Of Flight)), and a photometric apparatus (apparatus for measuring an incident light quantity or the like).

First Embodiment

The arrangement of an image capturing apparatus using a photoelectric conversion apparatus will be described with reference to FIG. 1. A pixel array 100 includes a plurality of pixels 101 arranged in a matrix. A vertical scanning circuit 107 sequentially scans the pixels 101 based on a signal output from a timing generator 108 (to be referred to as a "TG 108" hereinafter). The vertical scanning circuit 107 functions as a driving unit that drives the pixels for each row. Signals corresponding to an image of one frame can be obtained by scanning the pixel array 100 up to the final row. The pixel 101 outputs, via a vertical signal line 102, a noise signal serving as an analog signal equivalent to the noise level, and a photoelectric conversion signal serving as an analog signal based on charges generated by photoelectrically converting incident light. As the photoelectric conversion signal, the pixel 101 outputs a focus detection signal used for focus detection and an image signal used for image formation. FIG. 1 shows that pixels 101 are arranged in 4 rows×5 columns, but in practice the pixels 101 and the vertical signal lines 102 are provided in much more rows and columns.

Readout circuits 103 are provided in correspondence with the vertical signal lines 102 of respective columns. Each readout circuit 103 reads out a signal output from the pixel 101 via the vertical signal line 102. The readout signal includes a noise signal and a photoelectric conversion signal. The readout circuit 103 includes a current supply unit 207 that supplies a current to the pixel 101 via the vertical signal line 102. Note that the readout circuit 103 may include a memory unit that temporarily holds an analog signal, a column amplifier unit that amplifies an analog signal from the pixel, and an A/D conversion unit that converts an analog signal into a digital signal.

Signal holding units 104 hold signals output from the corresponding readout circuits 103. A horizontal scanning circuit 105 sequentially scans the signal holding units 104 of respective columns. The signals held by the signal holding units 104 of the respective columns are sequentially transferred from the signal holding units 104 of the respective columns to a signal processing unit (to be referred to as a "DSP" hereinafter) 106. The DSP 106 processes the signals output from the signal holding units 104 of the respective columns, and outputs the processed signals to outside the image capturing apparatus. The TG 108 controls the operations of the readout circuits 103, signal holding units 104, horizontal scanning circuit 105, DSP 106, and vertical scanning circuit 107.

Figure 2:
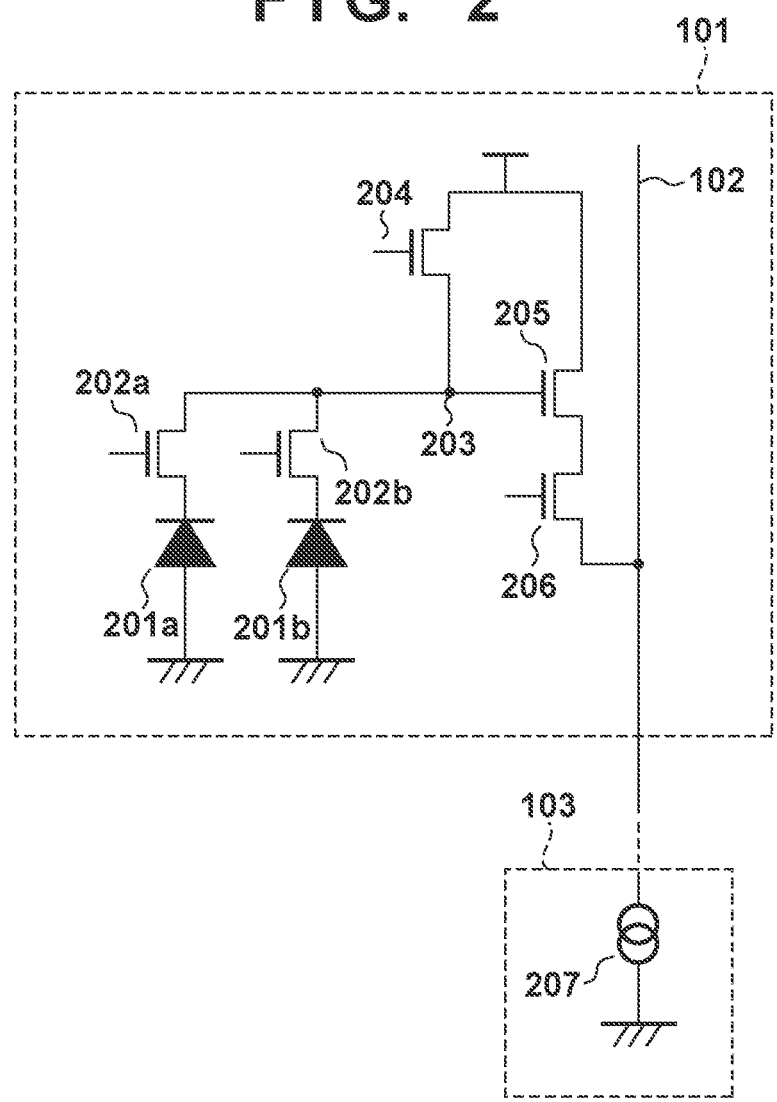
FIG. 2 is a circuit diagram showing an example of the arrangement of a pixel.

The pixel 101 arranged in the pixel array 100 and the readout circuit 103 will be described with reference to FIG. 2. FIG. 2 shows the current supply unit 207 included in a circuit of the readout circuit 103 for one column. The pixel 101 can include a plurality of photoelectric conversion units. The embodiment exemplifies two photoelectric conversion units.

Photoelectric conversion units 201a and 201b in the pixel 101 generate charges based on incident light. Transistors 202a and 202b are provided on electrical paths between the photoelectric conversion units 201a and 201b and a charge-voltage conversion unit (to be referred to as a "FD unit" hereinafter) 203, respectively. The transistor 202a is a transfer transistor that controls ON/OFF of transfer of charges from the photoelectric conversion unit 201a to the FD unit 203. The transistor 202b is a transfer transistor that controls ON/OFF of transfer of charges from the photoelectric conversion unit 201b to the FD unit 203.

The transfer transistors 202a and 202b transfer charges generated by the photoelectric conversion units to the FD unit 203. The FD unit 203 converts the charge signal into a voltage signal. The pixel 101 can include a microlens that condenses incident light, and a color filter corresponding to a color.

A transistor 204 has one main node electrically connected to the FD unit 203, and the other main node that receives a power supply voltage VDD from a power supply voltage terminal. The transistor 204 is a reset transistor that is turned on or off to reset the potential of the FD unit 203.

A transistor 205 has an input node electrically connected to the FD unit 203, and one main node that receives the power supply voltage VDD from the power supply voltage terminal. The transistor 205 has the other main node electrically connected to one main node of a transistor 206 and one main node of the transistor 204. The transistor 205 is an amplification transistor functioning as an output unit that amplifies an analog signal based on the potential of the FD unit 203, and outputs the amplified signal to the vertical signal line 102.

The other main node of the transistor 206 is electrically connected to the vertical signal line 102. The transistor 206 is a selection transistor that switches connection/disconnection between the amplification transistor 205 and the vertical signal line 102.

The vertical scanning circuit 107 supplies signals ptxa, ptxb, pres, and psel to the control nodes of the transfer transistors 202a and 202b, reset transistor 204, and selection transistor 206, respectively. When a high potential Hi is input to the control nodes of the transfer transistors 202a and 202b, reset transistor 204, and selection transistor 206, the respective transistors are turned on. When all the transfer transistors 202a and 202b and the reset transistor 204 are turned on, the photoelectric conversion units 201a and 201b and the FD unit are reset. To the contrary, when a low potential Lo is input to the control nodes, the respective transistors are turned off. A current source serving as the current supply unit 207 supplies a current to the amplification transistor 205 of the pixel 101 via the vertical signal line 102.

The amplification transistor 205 performs a source follower operation in accordance with a current supplied from the current supply unit 207 connected to the vertical signal line 102 and the power supply voltage VDD. The selection transistor 206 can switch the connection of the output of the amplification transistor 205 of the pixel 101 to the vertical signal line 102.

With this arrangement, a focus detection signal and an image signal can be obtained from the pixel 101. When obtaining a focus detection signal, only signal charges generated in the photoelectric conversion unit 201a or 201b may be transferred to the FD unit 203. A focus detection signal is obtained by reading only the signal of one photoelectric conversion unit from the pixels 101 two-dimensionally arranged in a matrix.

In contrast, when obtaining an image signal, signals from the photoelectric conversion units 201a and 201b are transferred to the FD unit 203, mixed, and read out as an image signal. When signals from both the photoelectric conversion units 201a and 201b are necessary as a focus detection signal, a readout signal from the one photoelectric conversion unit is subtracted from an image signal. Note that the arrangement of transistors in the pixel is arbitrary such that the reset transistor 204 and the amplification transistor 205 are shared between two or more pixels.

Figure 3:
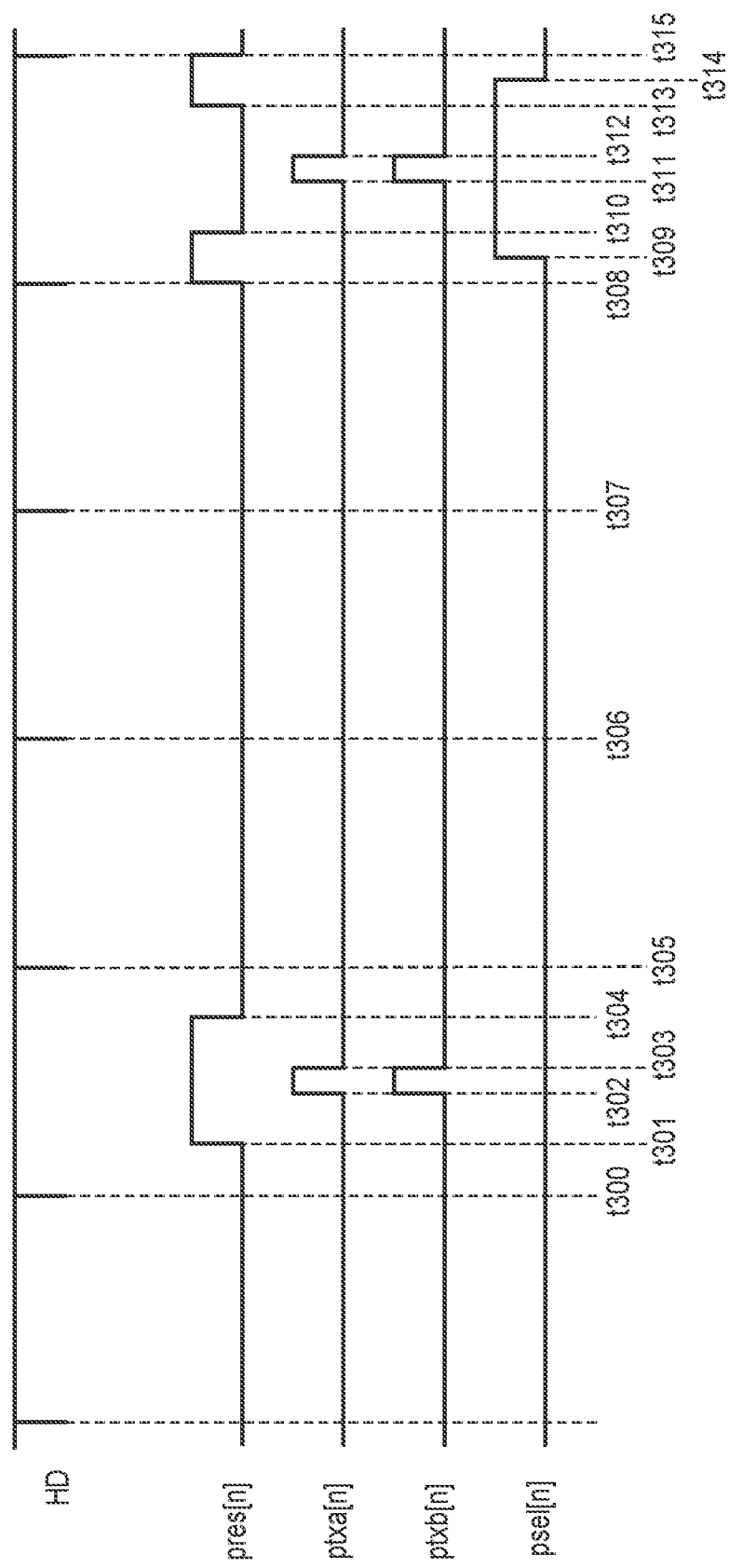
FIG. 3 is a timing chart showing the driving timing of a pixel according to the first embodiment.

Next, the driving timing of the image capturing apparatus will be described with reference to FIGS. 3 and 4. A time from t300 to t315 in FIG. 3 represents the first operation of obtaining an image signal for image capturing. Here, [n] means the nth row of the pixels 101 arranged in a matrix, and represents the driving timing of each signal when reading out a noise signal and an image signal from the pixels of the nth row via the vertical signal lines 102.

Figure 4:
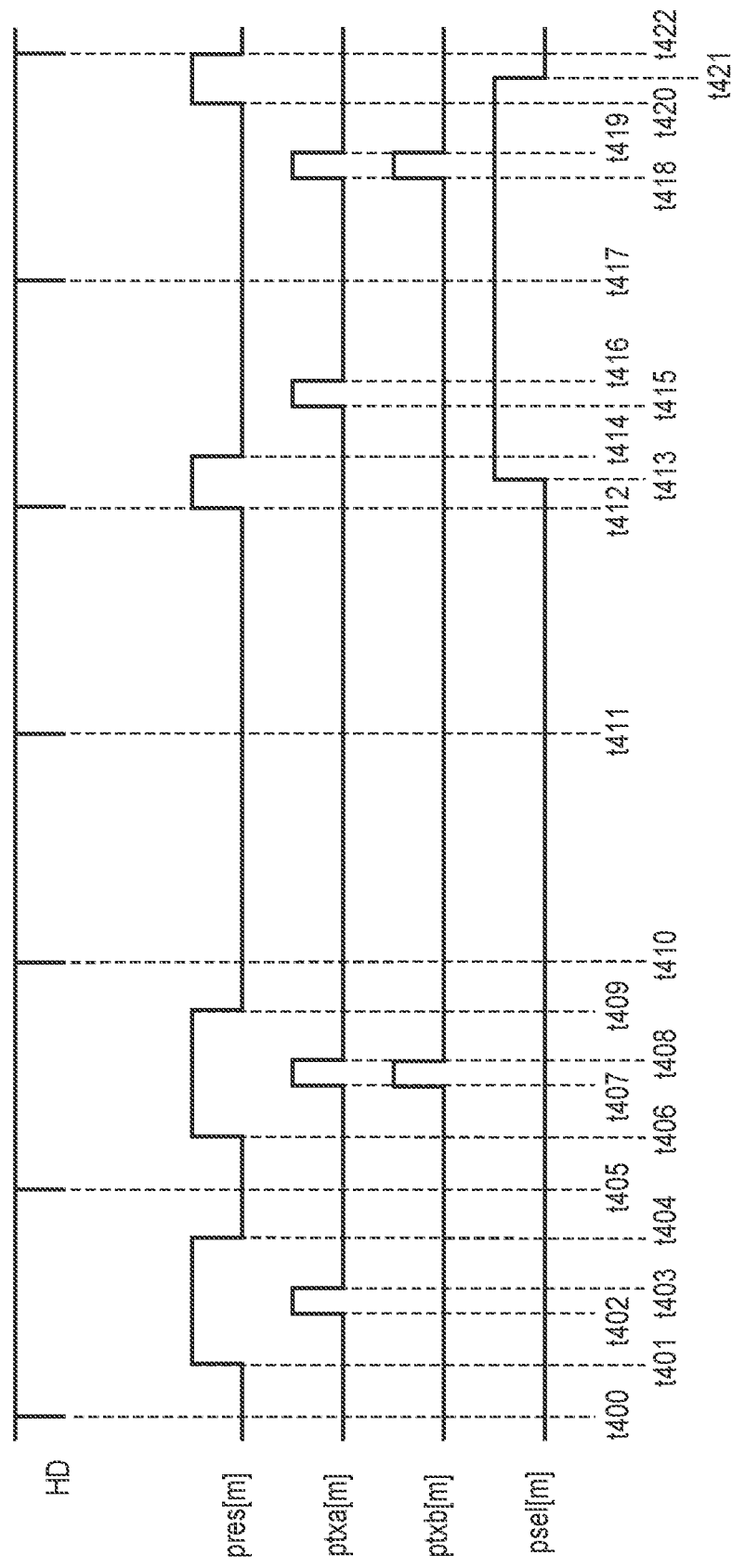
FIG. 4 is a timing chart showing the driving timing of a pixel according to the first embodiment.

A time from t400 to t422 in FIG. 4 represents the second operation capable of obtaining both a focus detection signal for focus detection and an image signal for image capturing. Here, [m] means the mth row of the pixels 101 arranged in a matrix. FIG. 4 shows driving timings when reading out a noise signal, a focus detection signal, and an image signal via the vertical signal lines 102 from the pixels of the mth row out of the pixels 101 arranged in a matrix.

The vertical scanning circuit 107 is controlled by a horizontal synchronizing signal (to be referred to as a "signal HD" hereinafter). The signal HD changes from Hi to Lo, controlling the start of a reset operation and signal readout operation in the first and second operations.

The reset operation includes an operation of resetting the photoelectric conversion unit and FD unit of the photoelectric conversion apparatus. The signal readout operation includes an operation of reading out a noise signal, a focus detection signal, and an image signal from the pixel 101.

A period from the reset operation to the signal readout operation is a period in which charges are accumulated in the photoelectric conversion units 201a and 201b, that is, an accumulation period. Letting the unit of the interval of the horizontal synchronizing signal HD be one horizontal synchronizing signal period (one H period), FIGS. 3 and 4 show timings of the driving method when the accumulation period equals four horizontal synchronizing signal periods (four H periods).

The first operation will be explained with reference to FIG. 3. At time t300, the signal HD changes to Lo, starting the reset operation of the photoelectric conversion units of the nth row. At time t301, the signal pres[n] changes from Lo to Hi, turning on the reset transistors 204. As a result, the FD units 203 are reset.

At time t302, the signals ptxa[n] and ptxb[n] change to Hi. The transfer transistors 202a are turned on, resetting charges of the photoelectric conversion units 201a. Also, the transfer transistors 202b are turned on, resetting charges of the photoelectric conversion units 201b. At time t303, the signals ptxa[n] and ptxb[n] change to Lo. Then, the transfer transistors 202a are turned off, ending the reset of charges of the photoelectric conversion units 201a. The transfer transistors 202b are turned off, ending the reset of charges of the photoelectric conversion units 201b.

At time t304, the signal pres[n] changes from Hi to Lo, turning off the reset transistors 204. Then, the reset of the FD units 203 ends. At time t305, the signal HD changes to Lo, ending the reset operation of the nth row in the first operation.

At each of time t306, time t307, and time t308, the signal HD changes to Lo. At time t308, the signal HD changes to Lo, starting the signal readout operation of the photoelectric conversion units of the nth row in the first operation. In the embodiment, the pixels are driven at these timings, so the period from the reset operation to the signal readout operation is four H periods, and the accumulation period is four H periods.

At time t308, the signal HD changes to Lo, starting the signal readout operation of the nth row in the first operation. Also, at time t308, the signal pres[n] changes from Lo to Hi, turning on the reset transistors 204. Hence, the FD units 203 are reset.

At time t309, the signal psel[n] changes to Hi, turning on the selection transistors 206 of the nth row. In response to this, the amplification transistors 205 of the pixels 101 of the nth row are electrically connected to the vertical signal lines 102 via the selection transistors 206.

At time t310, the signal pres[n] changes from Hi to Lo, turning off the reset transistors 204. Then, the reset of the FD units 203 is canceled. Noise signals based on the potentials of the reset FD units 203 are output from the pixels 101 of the nth row via the vertical signal lines 102.

At an interval between time t310 and time t311, the noise signals of the nth row are read out by the readout circuits 103 via the vertical signal lines 102, and held in the signal holding units 104. At time t311, the signals ptxa[n] and ptxb[n] change to Hi. The transfer transistors 202a are turned on, transferring the signals of the photoelectric conversion units 201a to the FD units 203. Also, the transfer transistors 202b are turned on, transferring the signals of the photoelectric conversion units 201b to the FD units 203. The signals of the photoelectric conversion units 201a and 201b are transferred to the FD units 203 and mixed, obtaining the image signals of the pixels 101.

At time t312, the signals ptxa[n] and ptxb[n] change to Lo. The transfer transistors 202a are turned off, ending the transfer of the signals of the photoelectric conversion units 201a to the FD units 203. Also, the transfer transistors 202b are turned off, ending the transfer of the signals of the photoelectric conversion units 201b to the FD units 203. The image signals of the pixels of the nth row are converted into voltages by the FD units, and the voltages are output to the vertical signal lines 102 via the amplification transistors 205. At an interval between time t312 and time t313, the image signals of the nth row are read out by the readout circuits 103 via the vertical signal lines 102, and held in the signal holding units 104.

At time t313, the signal pres[n] changes from Lo to Hi, turning on the reset transistors 204. Then, the FD units 203 are reset. At time t314, the signal psel[n] changes to Lo, turning off the selection transistors 206 of the nth row. In response to this, the amplification transistors 205 of the pixels 101 of the nth row and the vertical signal lines 102 are electrically disconnected.

After time t313, the horizontal scanning circuit 105 sequentially scans the signal holding units 104, outputting the held noise signals and image signals of the respective columns to the DSP 106. The image signal contains the component of the noise signal. The DSP 106 subtracts the noise signal from the image signal, generating a noise signal-reduced signal for image capturing. At time t315, the signal HD changes to Lo, ending the signal readout operation of the nth row in the first operation.

Next, the second operation will be explained with reference to FIG. 4. In the first operation, the reset operation and the signal readout operation are respectively performed in one horizontal synchronizing signal period (one H period). In the second operation, the reset operation and the signal readout operation are respectively performed in two horizontal synchronizing signal periods (two H periods). The second operation may be performed in one H period or more or two H periods or less. However, when the second operation is performed in two H periods, the circuit scales of the DSP 106 and TG 108 are reduced.

At time t400, the signal HD changes to Lo, starting the reset operation of the photoelectric conversion units of the mth row in the second operation. At time t401, the signal pres[m] changes from Lo to Hi, turning on the reset transistors 204. As a result, the FD units 203 are reset.

At time t402, the signal ptxa[m] changes to Hi. The transfer transistors 202a are turned on, resetting charges of the photoelectric conversion units 201a. At time t403, the signal ptxa[m] changes to Lo. The transfer transistors 202a are turned off, ending the reset of charges of the photoelectric conversion units 201a.

At time t404, the signal pres[m] changes from Hi to Lo, turning off the reset transistors 204. Then, the reset of the FD units 203 ends. At time t405, the signal HD changes to Lo, but the reset operation of the mth row continues in the second operation.

At time t406, the vertical scanning circuit 107 changes the signal pres[m] from Lo to Hi, turning on the reset transistors 204. Accordingly, the FD units 203 are reset.

At time t407, the signals ptxa[m] and ptxb[m] change to Hi. The transfer transistors 202a are turned on, resetting charges of the photoelectric conversion units 201a. Also, the transfer transistors 202b are turned on, resetting charges of the photoelectric conversion units 201b.

At time t408, the signals ptxa[m] and ptxb[m] change to Lo. Then, the transfer transistors 202a are turned off, ending the reset of charges of the photoelectric conversion units 201a. The transfer transistors 202b are turned off, ending the reset of charges of the photoelectric conversion units 201b. At time t409, the signal pres[m] changes from Hi to Lo, turning off the reset transistors 204. Then, the reset of the FD units 203 ends.

At time t410, the signal HD changes to Lo, ending the reset operation of the mth row in the second operation. At each of time t411 and time t412, the signal HD changes to Lo. At time t412, the signal readout operation of the mth row in the second operation starts. The period from the reset operation to the signal readout operation is four H periods, so the accumulation period is four H periods.

At time t412, the signal pres[m] changes from Lo to Hi, turning on the reset transistors 204. In response to this, the FD units 203 are reset. At time t413, the signal psel[m] changes to Hi, turning on the selection transistors 206 of the mth row. Then, the amplification transistors 205 of the pixels 101 of the mth row are electrically connected to the vertical signal lines 102 via the selection transistors 206.

At time t414, the signal pres[m] changes from Hi to Lo, turning off the reset transistors 204. Hence, the reset of the FD units 203 is canceled. Noise signals based on the potentials of the reset FD units 203 are output from the pixels 101 of the mth row to the vertical signal lines 102.

At an interval between time t414 and time t415, the noise signals of the mth row are read out by the readout circuits 103 via the vertical signal lines 102, and held in the signal holding units 104. At time t415, the signal ptxa[m] changes to Hi. The transfer transistors 202a are turned on, transferring the signals of the photoelectric conversion units 201a to the FD units 203. Of the signals of the photoelectric conversion units 201a and 201b, only the signals of the photoelectric conversion units 201a are transferred to the FD units 203. The transferred signals are used as the focus detection signals of the pixels 101.

At time t416, the signal ptxa[m] changes to Lo. Then, the transfer transistors 202a are turned off, ending the transfer of the signals of the photoelectric conversion units 201a to the FD units 203. The focus detection signals of the mth row are output to the vertical signal lines 102. At an interval between time t416 and time t417, the focus detection signals of the mth row are read out by the readout circuits 103 via the vertical signal lines 102, and held in the signal holding units 104.

At time t417, the signal HD changes to Lo, but the signal readout operation of the mth row continues. At time t418, the signals ptxa[m] and ptxb[m] change to Hi. The transfer transistors 202a are turned on, transferring the signals of the photoelectric conversion units 201a to the FD units 203. Also, the transfer transistors 202b are turned on, transferring the signals of the photoelectric conversion units 201b to the FD units 203. The signals of the photoelectric conversion units 201a and 201b are transferred to the FD units 203 and mixed, obtaining the image signals of the pixels 101.

At time t419, the signals ptxa[m] and ptxb[m] change to Lo. The transfer transistors 202a are turned off, ending the transfer of the signals of the photoelectric conversion units 201a to the FD units 203. The transfer transistors 202b are turned off, ending the transfer of the signals of the photoelectric conversion units 201b to the FD units 203. As a result, the image signals of the pixels of the mth row are output to the vertical signal lines 102.

At an interval between time t419 and time t420, the image signals of the mth row are read out by the readout circuits 103 via the vertical signal lines 102, and held in the signal holding units 104. At time t420, the signal pres[m] changes from Lo to Hi, turning on the reset transistors 204. In response to this, the FD units 203 are reset.

At time t421, the signal psel[m] changes to Lo, turning off the selection transistors 206 of the mth row. Then, the amplification transistors 205 of the pixels 101 of the mth row and the vertical signal lines 102 are electrically disconnected. After time t420, the horizontal scanning circuit 105 sequentially scans the signal holding units 104, outputting the held noise signals, focus detection signals, and image signals of the respective columns to the DSP 106.

The focus detection signal and the image signal contain the component of the noise signal. The DSP 106 subtracts the noise signal from the focus detection signal, generating a noise signal-reduced signal for focus detection. The DSP 106 subtracts the noise signal from the image signal, generating a noise signal-reduced signal for image capturing. At time t422, the signal HD changes to Lo, ending the signal readout operation of the mth row in the second operation.

In the reset operation, the transfer transistors 202a are turned on at time t402. If the transfer transistors 202a and 202b are turned on at time t407, the photoelectric conversion units 201a and 201b can be reset. However, the transfer transistors are driven similarly in the reset period and the signal readout period, making the state of the charge-voltage conversion unit close between the reset period and the readout period. Further, a noise component arising from the operation of the transfer transistor is made close between the reset period and the readout period. This driving reduces a difference in characteristics caused by signal transfer.

Figure 5:
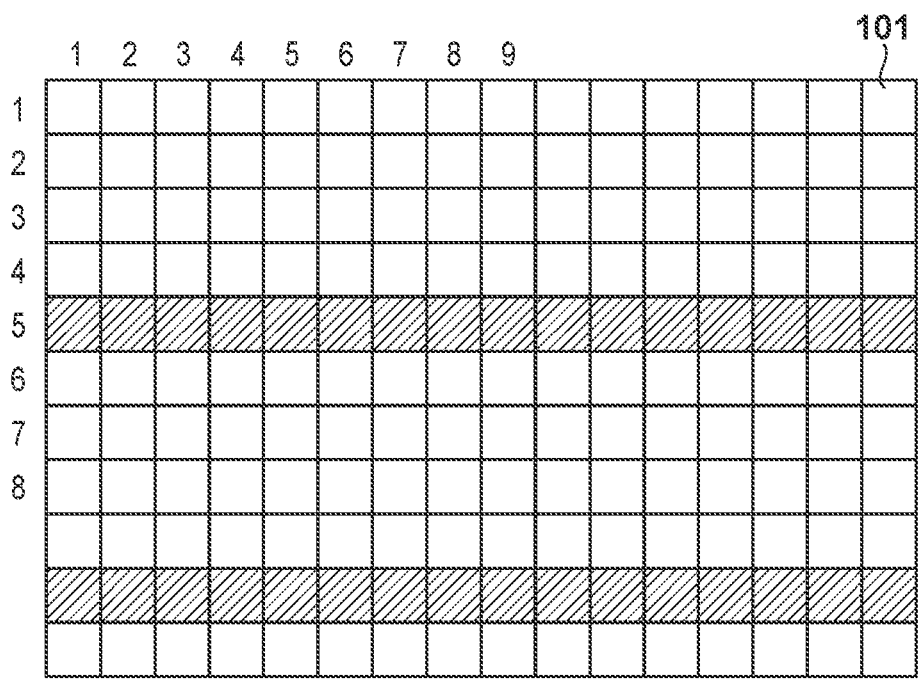
FIG. 5 is a view showing an example of the arrangement of a pixel array according to the first embodiment.

Next, driving of the image capturing apparatus to which the photoelectric conversion apparatus according to the embodiment is applied will be described with reference to FIGS. 5 and 6. An example of the arrangement of the pixel array 100 will be explained with reference to FIG. 5. In this example, the pixels 101 are arranged in a matrix. In FIG. 5, pixels vertically aligned from the left end in the horizontal direction form the first, second, and third columns. Also, in FIG. 5, pixels horizontally aligned from the upper end in the vertical direction form the first, second, and third rows. In this example, signals are read out from pixels on the first to fourth rows and the sixth to ninth rows by the first operation, and signals are read out from pixels on the fifth and 10th rows by the second operation.

That is, letting N be an integer of 1 or more, the first operation is applied to pixels of the Nth, (N+1)th, (N+2)th, and (N+3)th rows to read out image signals, and the second operation is applied to pixels of the (N+4)th row to read out focus detection signals and image signals.

Readout of signals from the photoelectric conversion units of pixels of each row in the image capturing apparatus will be described with reference to FIG. 6. [N] appended to each signal represents each signal corresponding to readout of signals from pixels of the Nth row of the pixel array 100. The horizontal axis represents the time. In this example, the signal accumulation period is four H periods. The reset operation and signal readout operation of pixels of respective rows are sequentially performed. The reset operations of respective rows do not overlap each other, and the signal readout operations of respective rows do not overlap each other.

At time t600, the signal HD changes to Lo, starting the reset operation of the Nth row in the first operation. At time t601, the signal HD changes to Lo, ending the reset operation of the Nth row in the first operation and starting the reset operation of the (N+1)th row in the first operation.

At time t602, the signal pres[N+3] changes from Hi to Lo. This operation corresponds to cancellation of the reset of the FD units 203 at time t304 shown in FIG. 3.

At time t603 four H periods after time t600, the signal HD changes to Lo, starting the signal readout operation of the Nth row in the first operation. Also, the reset operation of the (N+3)th row in the first operation ends, and the signal reset operation of the (N+4)th row in the second operation starts.

At time t604, the signal pres[N+4] changes from Lo to Hi. This operation corresponds to the reset of the FD units 203 at time t401 shown in FIG. 4.

At time t605, the signal pres[N+4] changes from Hi to Lo. This operation corresponds to cancellation of the reset of the FD units 203 at time t404 shown in FIG. 4.

At time t606, the signal HD changes to Lo, ending the signal readout operation of the Nth row in the first operation and starting the signal readout of the (N+1)th row in the first operation. The signal reset operation of the (N+4)th row in the second operation continues.

At time t607, the signal pres[N+4] changes from Lo to Hi. This operation corresponds to the reset of the FD units 203 at time t406 shown in FIG. 4.

At time t608, the signal HD changes to Lo, ending the signal readout operation of the (N+1)th row in the first operation and starting the signal readout operation of the (N+2)th row in the first operation. The reset operation of the (N+4)th row in the second operation ends, and the reset operation of the (N+5)th row in the first operation starts.

At time t609, the signal HD changes to Lo, ending the signal readout operation of the (N+3)th row in the first operation and starting the signal readout operation of the (N+4)th row in the second operation. At time t610, the signal HD changes to Lo, ending the signal readout operation of the (N+4)th row in the second operation and starting the signal readout operation of the (N+5)th row in the first operation.

The above-described operations are repeated for all arbitrary rows, obtaining signals of one frame.

Figure 6:
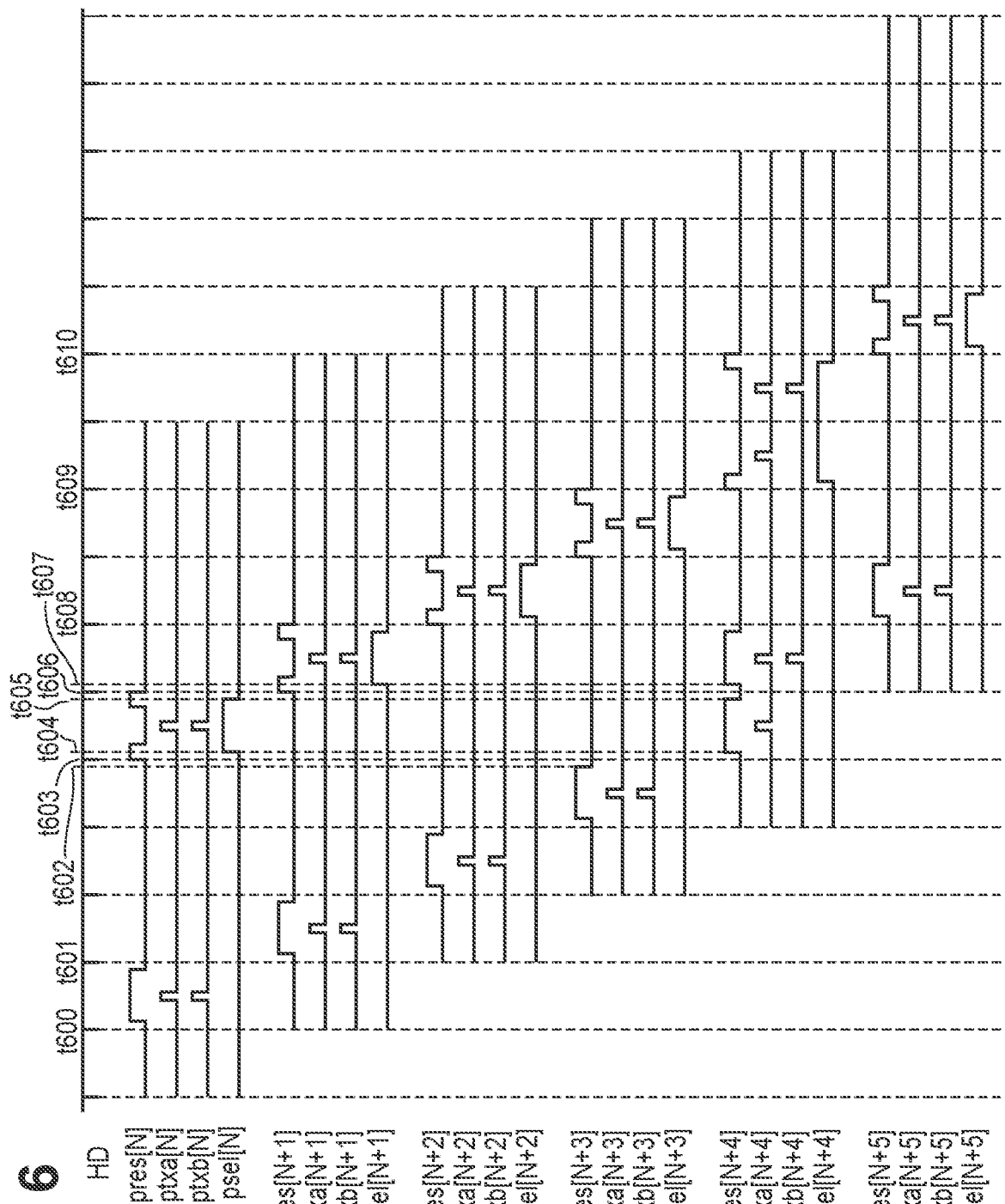
FIG. 6 is a timing chart showing the driving timing of an image capturing apparatus according to the first embodiment.
Figure 7:
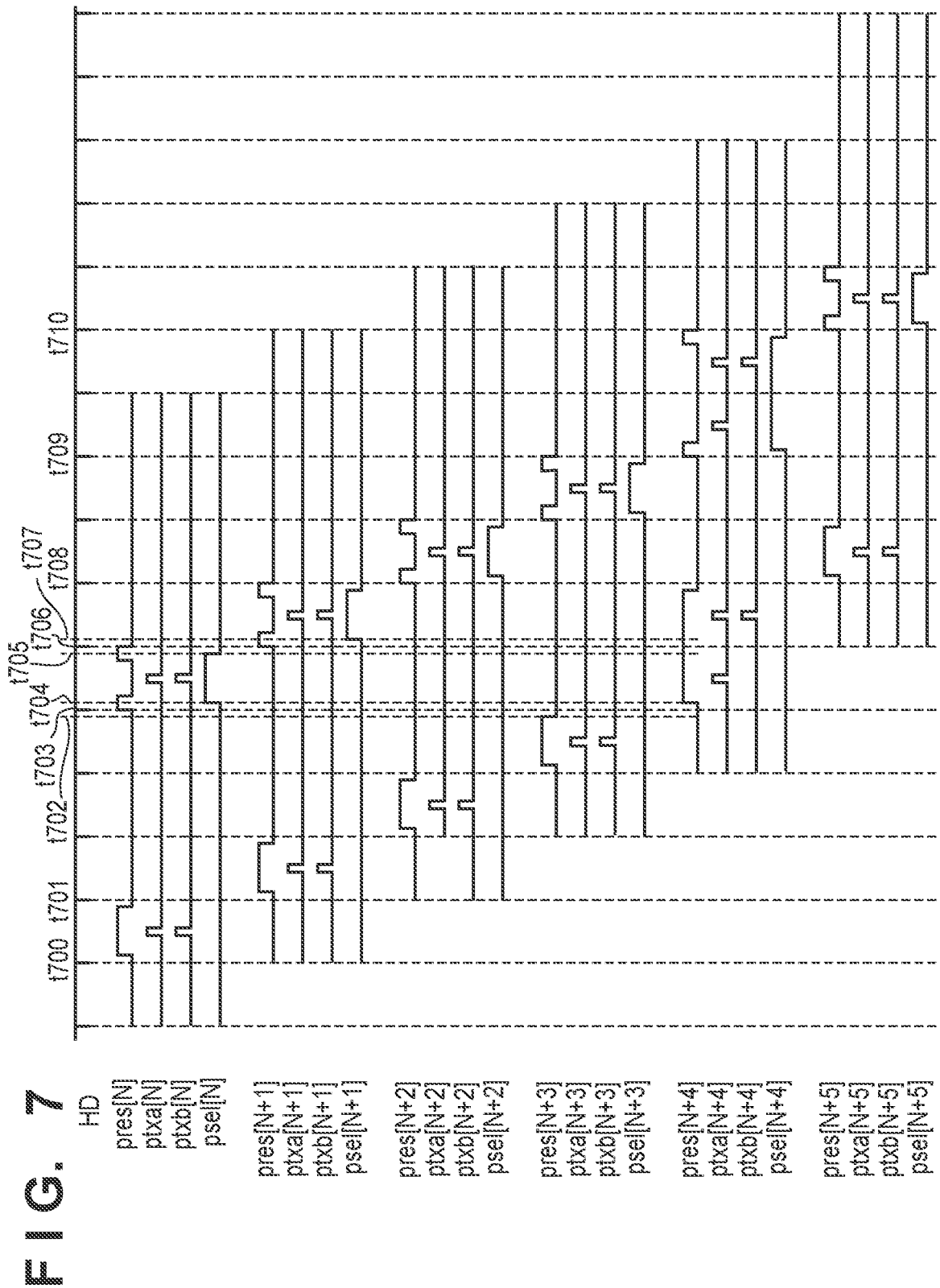
FIG. 7 is a timing chart showing a comparative example of the driving timing of the image capturing apparatus.

Readout of a signal from the photoelectric conversion apparatus will be described with reference to FIG. 7 showing a comparative example with respect to the example shown in FIG. 6. In FIG. 6, the signal pres[N+4] changes from Hi to Lo at time t605, and changes from Lo to Hi at time t607. However, in FIG. 7, the signal pres[N+4] does not change at neither time t705 nor t707. Except this, FIGS. 6 and 7 are identical.

The signal pres changes from the high potential Hi to the low potential Lo. The Hi potential at this time is referred to as DVDDH, and the Lo potential is referred to as GND (0 V). At time t602, the signal pres[N+3] changes from Hi to Lo, that is, from DVDDH to GND. At time t604, the signal pres[N+4] changes from Lo to Hi, that is, from GND to DVDDH. At the time of the change, the DVDDH potential fluctuates. Under the influence of the fluctuation of the DVDDH potential, image signals of the Nth row fluctuate in the readout operation of image signals of the Nth row from time t603. This may arise from a change of the state of the potentials of the FD units 203 of pixels of the Nth row. Similarly, image signals of the (N+1)th row fluctuate upon a change of the signal pres[N+4] from Hi to Lo at time t605 and a change from Lo to Hi at time t607.

To the contrary, at time t705 one H period after time t702 and at time t707 one H period after time t704, the signal pres does not change in the signal reset operation of any row. Thus, fluctuations of the DVDDH potential are suppressed. In the readout operation from time t706, the influence of DVDDH fluctuations on image signals of the (N+1)th row is suppressed.

If driving of the signal pres is different between the reset operation of the first operation performed immediately before the signal readout operation of the Nth row, and the reset operation of the second operation performed immediately before the signal readout operation of the (N+1)th row, the amount of noise generated along with the change of DVDDH differs. In the comparative example of FIG. 7, therefore, an output difference may be generated between image signals of the Nth and (N+1)th rows. In the comparative example, horizontal stripes may appear every five rows in an image.

In contrast, in the example of FIG. 6, the signal pres[N+4] changes from Hi to Lo, that is, from DVDDH to GND at time t605. At time t607, the signal pres[N+4] changes from Lo to Hi, that is, from GND to DVDDH. At the time of the change, the DVDDH potential fluctuates. Image signals of the (N+1)th row receive an influence similar to that on the Nth row.

As described above, the amount of superposed fluctuation noise can be reduced by driving the signal pres similarly between the reset operation of the first operation performed immediately before the signal readout operation of the Nth row, and the reset operation of the second operation performed immediately before the signal readout operation of the (N+1)th row. This reduces an output difference appearing in image signals of the Nth and (N+1)th rows. Horizontal stripes every five rows can be reduced in an obtained image.

In the embodiment, the cycle of the accumulation period is four H periods. When the cycle of the accumulation period is three H periods, an output difference is generated in image signals of the (N+1)th and (N+2)th rows. In other words, a row on which an output difference in the image signal is generated changes depending on the accumulation period. Depending on the accumulation period, an output difference is also generated between an image signal by the first operation and an image signal by the second operation. In the embodiment, variations of the image signal can be reduced by similarly performing driving of the reset of a row of pixels subjected to the first operation and the reset of a row of pixels subjected to the second operation. In any case, an output difference in the image signal can be reduced by the method of driving pixels in the embodiment.

Note that the Lo potential of the signal pres is described as GND (ground level), but may not be GND as long as the reset transistor 204 is turned off at this potential.

In the case of the timings described in the embodiment, a difference of one H period is generated in a period from the readout operation to the reset operation, at the time of image capturing between a row subjected to readout by the first operation and a row subjected to readout by the second operation. When many charges are accumulated in the photoelectric conversion unit, they may influence the leakage amount of charges to an adjacent row, generating an output difference. It is sometimes advantageous to noise reduction not to reset charges of the photoelectric conversion unit 201*a* from time t402 to time t403 in the signal reset operation of the second readout method.

Second Embodiment

Figure 8:
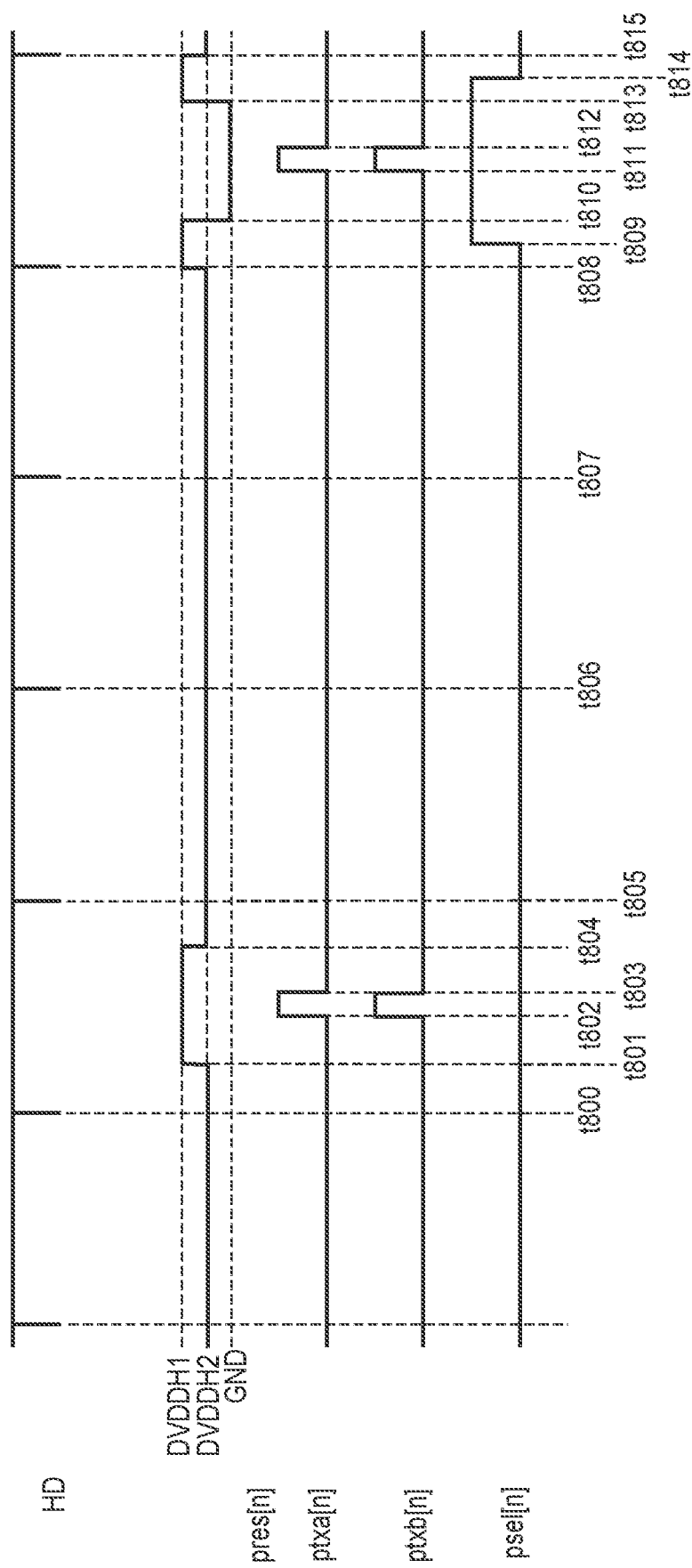
FIG. 8 is a timing chart showing the driving timing of a pixel according to the second embodiment.
Figure 9:
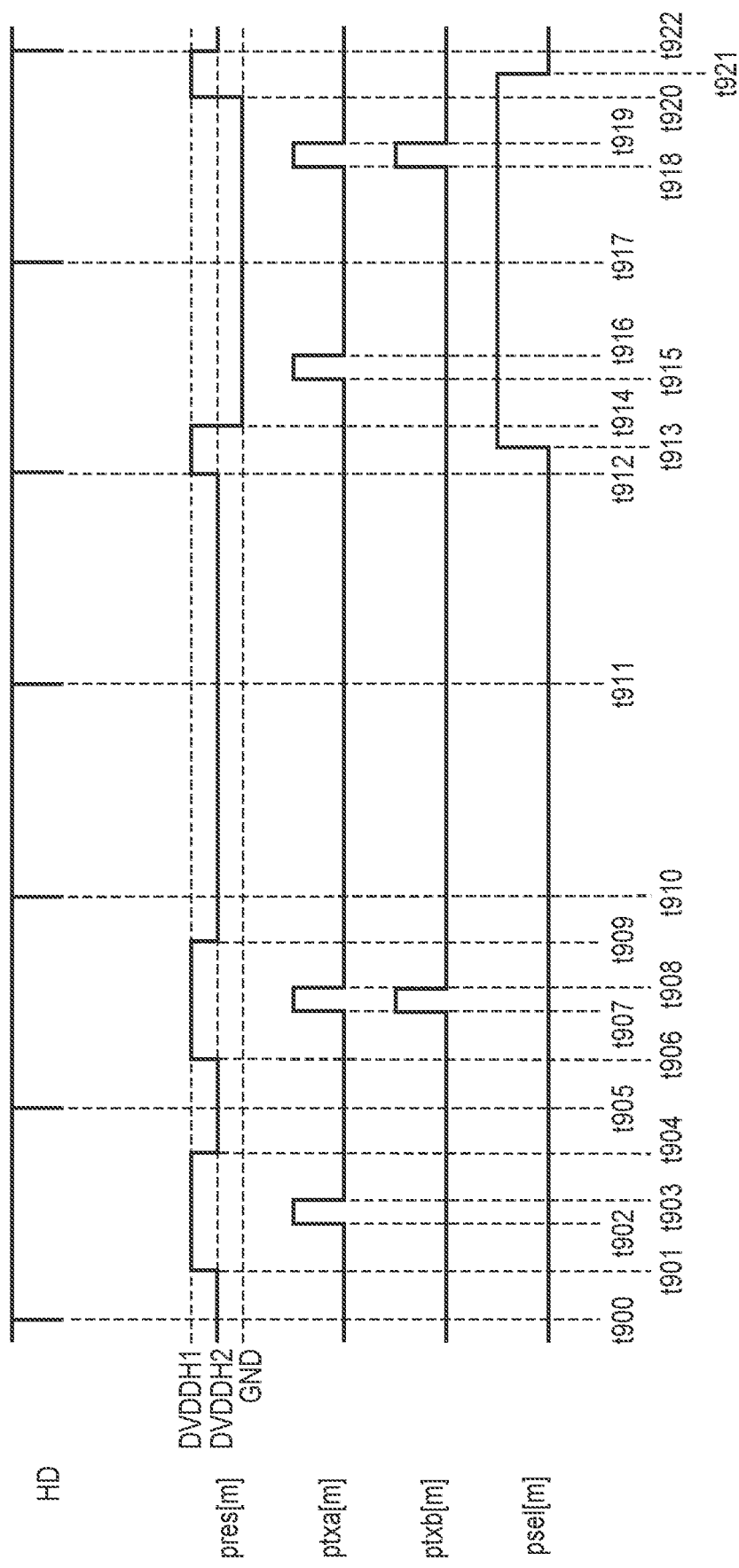
FIG. 9 is a timing chart showing the driving timing of a pixel according to the second embodiment.

In the first embodiment, the signal pres takes the two values Hi and Lo. FIG. 8 will be described as a modification example of the first embodiment. In the second embodiment, a signal pres takes three values. The first operation when the signal pres takes three values will be described with reference to FIG. 8. The second operation when the signal pres takes three values will be described with reference to FIG. 9. Signals ptxa, ptxb, and psel except the signal pres are the same as those in the first embodiment using FIG. 3. Thus, the signal pres will be mainly explained. The signal pres takes three values, but the reset potential of a charge-voltage conversion unit is a potential close to the power supply voltage. Even if an intermediate potential level among the three values is applied as the signal pres to a reset transistor, the reset transistor can maintain the OFF state.

A highest potential Hi among the three values of the signal pres is DVDDH1, an intermediate potential Mid second highest to DVDDH1 is DVDDH2, and a lowest potential Lo is the GND level. These potentials have a relationship of DVDDH1>DVDDH2>GND.

At time t800, a signal HD changes to Lo, starting the reset operation of the nth row in the first operation. At this time, the potential of the signal pres[n] is DVDDH2. At time t801, the potential of the signal pres[n] from a vertical scanning circuit 107 changes from DVDDH2 to DVDDH1. In response to this, FD units 203 are reset.

At time t804, the potential of the signal pres[n] from the vertical scanning circuit 107 changes from DVDDH1 to DVDDH2. In response to this, the reset of the FD units 203 ends. At time t805, the signal HD changes to Lo, ending the reset operation of the nth row in the first operation. At time t808, the signal HD changes to Lo, starting readout of image signals of the nth row in the first operation. The potential of the signal pres[n] changes from DVDDH2 to DVDDH1. Then, the FD units 203 are reset.

At time t810, the potential of the signal pres[n] changes from DVDDH1 to GND, turning off reset transistors 204. Then, the reset of the FD units 203 is canceled. At time t813, the potential of the signal pres[n] changes from GND to DVDDH1, turning on the reset transistors 204. In response to this, the FD units 203 are reset. At time t815, the signal HD changes to Lo, ending the signal readout operation of the nth row in the first operation. The potential of the signal pres[n] changes from DVDDH1 to DVDDH2.

At time t900, the signal HD changes to Lo, starting the reset operation of the mth row in the second operation. At this time, the potential of the signal pres[m] is DVDDH2. At time t901, the potential of the signal pres[m] from the vertical scanning circuit 107 changes from DVDDH2 to DVDDH1. Then, the FD units 203 are reset. At time t904, the potential of the signal pres[m] from the vertical scanning circuit 107 changes from DVDDH1 to DVDDH2.

At time t905, the signal HD changes to Lo, but the signal reset operation of the mth row continues. At time t906, the vertical scanning circuit 107 changes the potential of the signal pres[m] from DVDDH2 to DVDDH1. At an interval between time t904 and time t906, the potential of gates serving as the control nodes of the reset transistors 204 changes from DVDDH1 to DVDDH2. At an interval between time t906 and time t909, the potential of the gates changes again from DVDDH2 to DVDDH1. At time t909, the potential of the signal pres[m] changes from DVDDH1 to DVDDH2.

At time t910, the signal HD changes to Lo, ending the reset operation of the mth row in the second operation. At time t912, the signal HD changes to Lo, starting the signal readout operation of the mth row in the second operation. The potential of the signal pres[m] changes from DVDDH2 to DVDDH1, resetting the FD units 203.

At time t914, the potential of the signal pres[m] changes from DVDDH1 to GND. Then, the reset of the FD units 203 is canceled. At time t920, the potential of the signal pres[m] changes from GND to DVDDH1, turning on the reset transistors 204. In response to this, the FD units 203 are reset. At time t922, the signal HD changes to Lo, ending the signal readout operation of the mth row in the second readout method. At this time, the potential of the signal pres[m] is controlled from DVDDH1 to DVDDH2.

Figure 10:
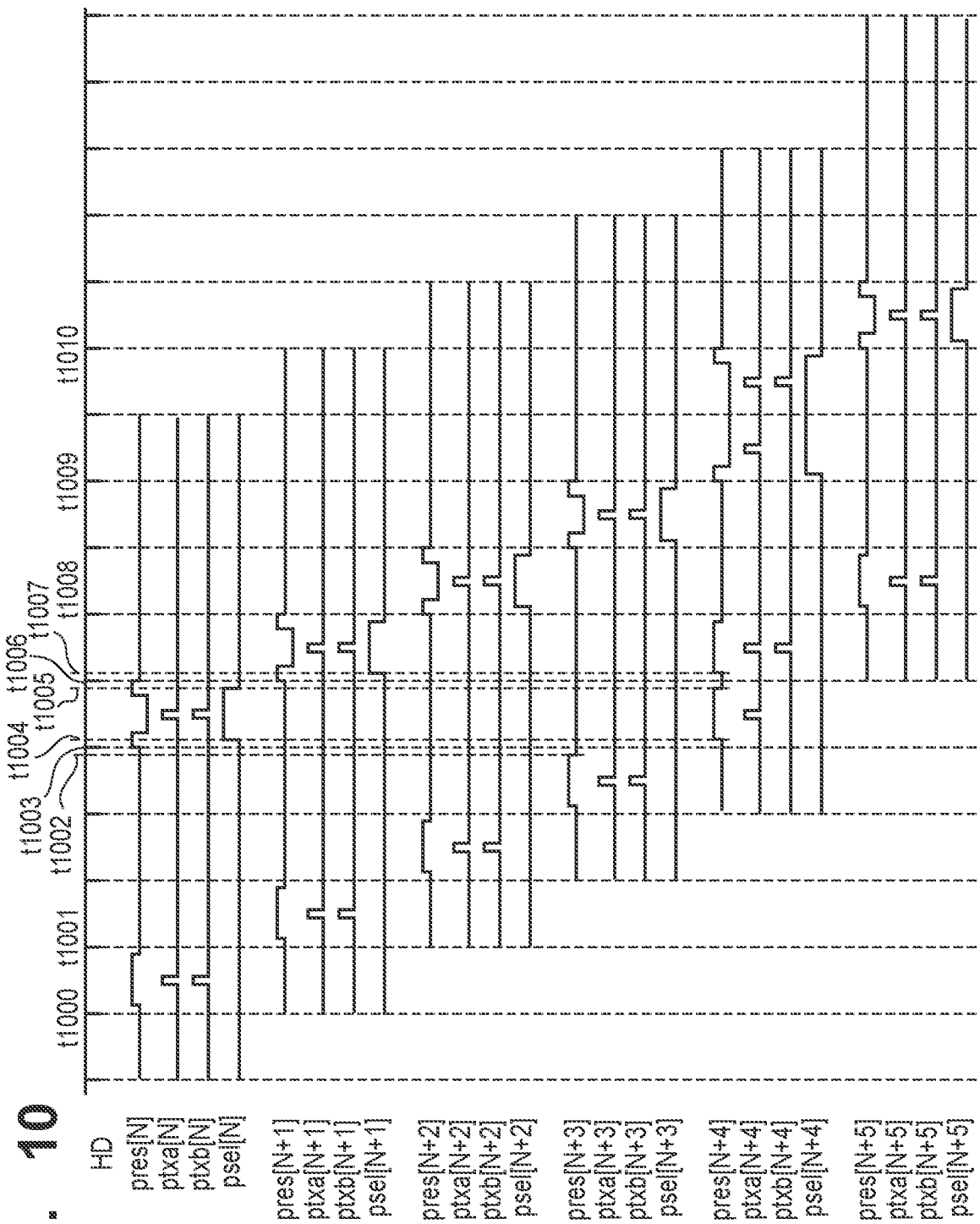
FIG. 10 is a timing chart showing the driving timing of an image capturing apparatus according to the second embodiment.

FIG. 10 is a timing chart showing an operation for each row in a pixel array 100 according to the embodiment. The horizontal axis represents the time, and the vertical direction corresponds to rows of the pixel array 100 shown in FIG. 5. The accumulation period is four H periods. Image signals are read out from the Nth, (N+1)th, (N+2)th, and (N+3)th rows by the first operation shown in FIG. 8, and focus detection signals and image signals are read out from the (N+4)th row by the second operation shown in FIG. 9.

The signal reset operations and signal readout operations of respective rows are sequentially performed. The signal reset operations of the respective rows do not overlap each other, and the signal readout operations of the respective rows do not overlap each other. At time t1000, the signal HD changes to Lo, starting the signal reset operation of the Nth row in the first operation.

At time t1001, the signal HD changes to Lo, ending the reset operation of the Nth row in the first operation and starting the reset operation of the (N+1)th row in the first operation. At time t1002, the potential of the signal pres[N+3] changes from DVDDH1 to DVDDH2. This operation corresponds to cancellation of the reset of the FD units 203 at time t804 shown in FIG. 8.

At time 1003 four H periods after time t1000, the signal HD changes to Lo, starting the signal readout operation of the Nth row in the first operation. The reset operation of the (N+3)th row in the first operation ends, and the reset operation of the (N+4)th row in the second operation starts.

At time t1004, the potential of the signal pres[N+4] changes from DVDDH2 to DVDDH1. This operation corresponds to the reset of the FD units 203 at time t901 shown in FIG. 9.

At time t1005, the potential of the signal pres[N+4] changes from DVDDH1 to DVDDH2. This operation corresponds to cancellation of the reset of the FD units 203 at time t904 shown in FIG. 9.

At time t1006, the signal HD changes to Lo, ending the signal readout operation of the Nth row in the first operation and starting the signal readout operation of the (N+1)th row in the first operation. The reset operation of the (N+4)th row in the second operation continues.

At time t1007, the potential of the signal pres[N+4] changes from DVDDH2 to DVDDH1. This operation corresponds to the reset of the FD units 203 at time t906 shown in FIG. 9.

At time t1008, the signal HD changes to Lo, ending the signal readout operation of the (N+1)th row in the first operation and starting the signal readout operation of the (N+2)th row in the first operation. The reset operation of the (N+4)th row in the second operation ends, and the reset operation of the (N+5)th row in the first operation starts.

At time t1009, the signal HD changes to Lo, ending the image signal readout operation of the (N+3)th row in the first operation and starting the readout operation of the (N+4)th row in the second operation. At time t1010, the signal HD changes to Lo, ending the second operation of the (N+4)th row and starting the image signal readout operation of the (N+5)th row in the first operation. The above-described operations are repeated for all arbitrary rows, obtaining signals of one frame.

In the embodiment, the potentials of the signals pres[N+3] and pres[N+4] change from DVDDH1 to DVDDH2 at time t1002 and time t1005. At time t1004 and time t1007, the potential of the signal pres[N+4] changes from DVDDH2 to DVDDH1. At the time of the change, the DVDDH potential may fluctuate. However, the fluctuation amount is reduced by using DVDDH2 higher in potential than GND described in the first embodiment. Hence, the influence on image signals of the Nth and (N+1)th rows can be reduced.

Since the signal pres takes three values, as described above, the fluctuation amount of a potential immediately before signal readout is decreased to reduce the amount of superposed noise. Accordingly, an output difference between image signals of the Nth and (N+1)th rows is reduced. As for an image, horizontal stripes every five rows are reduced. Although the lowest potential Lo of the signal pres is the GND level, it is not limited to GND as long as the reset transistor 204 is turned off at this potential.

As described above, according to the first and second embodiments, the circuit for reading out a noise signal and an image signal and the circuit for reading out a focus detection signal can be the same. The focus detection signal can be read out and obtained from one photoelectric conversion unit. The current of the readout circuit can be decreased, reducing power consumption.

According to the first and second embodiments, a reset operation when reading out both a signal for focus detection and a signal for image capturing, and a reset operation when reading out only a signal for image capturing are made uniform with respect to a signal readout operation. A difference in characteristics arising from the reset operation can be reduced, and the image quality can be improved.

Although the first and second embodiments have been described above, the present invention is not limited to these embodiments and can be variously changed and modified without departing from the spirit and scope of the invention. The present invention is applicable not only to an unstacked photoelectric conversion apparatus in which the arrangement shown in FIG. 1 is provided on one semiconductor substrate, but also to a stacked photoelectric conversion apparatus in which a plurality of semiconductor substrates are stacked. In the stacked photoelectric conversion apparatus, the pixel array 100 in FIG. 1 may be provided on the first substrate. At least part (including all) of the arrangement in FIG. 1 except the pixel array 100 can be provided on the second substrate. Still another semiconductor substrate may be stacked. In this case, the photoelectric conversion apparatus can be constituted by stacking the first substrate on which the pixel array 100 is provided, and a plurality of substrates each having part of the arrangement in FIG. 1 except the pixel array 100.

(Example of Application to Equipment)

Figure 11:
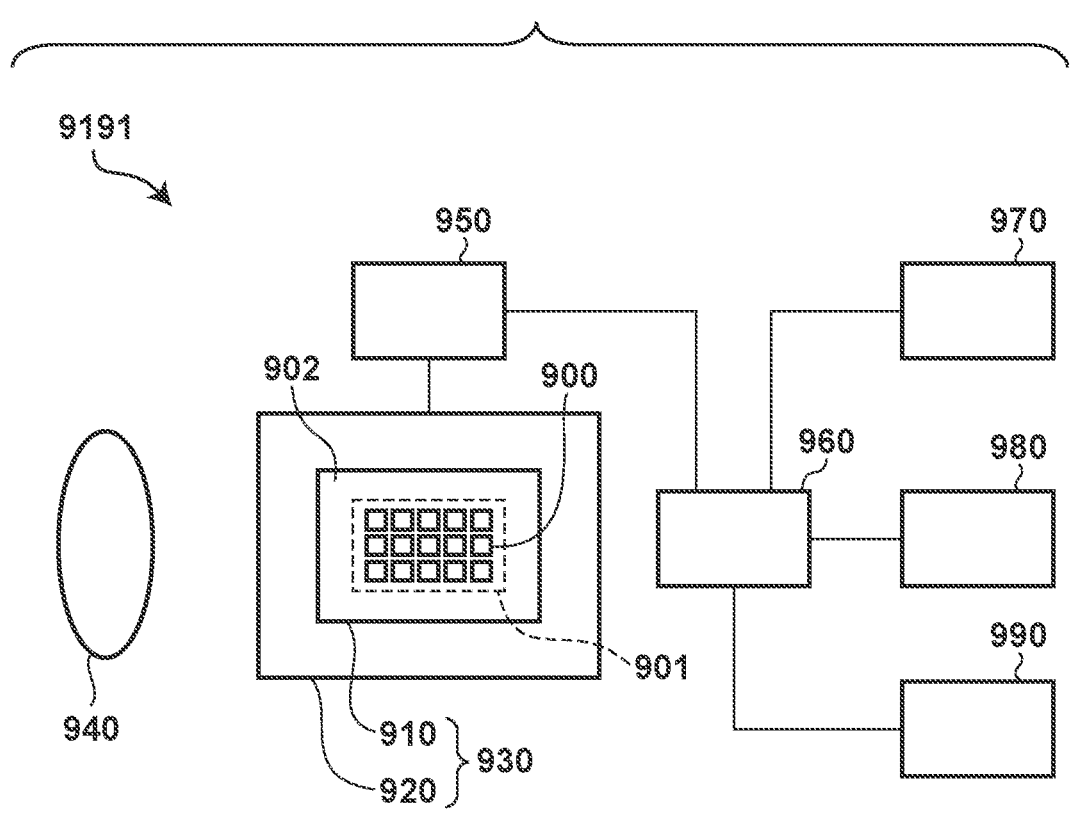
FIG. 11 is a view showing an example of an application to an equipment.

FIG. 11 is a schematic view for explaining an equipment 9191 including a semiconductor apparatus 930 according to the embodiment. The equipment 9191 including the semiconductor apparatus 930 will be described in detail. The semiconductor apparatus 930 can include a semiconductor device 910 having a semiconductor layer, as described above, and a package 920 that stores the semiconductor device 910. The package 920 can include a base on which the semiconductor device 910 is fixed, and a lid made of glass or the like facing the semiconductor device 910. The package 920 can further include bonding members such as a bonding wire and bump for connecting a terminal of the base and a terminal of the semiconductor device 910. The photoelectric conversion apparatus described in the first or second embodiment can be applied to the semiconductor device 910.

The equipment 9191 can include at least any of an optical apparatus 940, a control apparatus 950, a processing apparatus 960, a display apparatus 970, a storage apparatus 980, and a mechanical apparatus 990. The optical apparatus 940 corresponds to the semiconductor apparatus 930. The optical apparatus 940 is implemented by, for example, a lens, a shutter, and a mirror. The control apparatus 950 controls the semiconductor apparatus 930. The control apparatus 950 is, for example, a semiconductor apparatus such as an ASIC.

The processing apparatus 960 processes a signal output from the semiconductor apparatus 930. The processing apparatus 960 is a semiconductor apparatus such as a CPU or ASIC for forming an AFE (Analog Front End) or a DFE (Digital Front End). The display apparatus 970 is an EL display apparatus or liquid crystal display apparatus that displays information (image) obtained by the semiconductor apparatus 930. The storage apparatus 980 is a magnetic device or semiconductor device that stores the information (image) obtained by the semiconductor apparatus 930. The storage apparatus 980 is a volatile memory such as an SRAM or DRAM or a nonvolatile memory such as a flash memory or hard disk drive.

The mechanical apparatus 990 includes a moving or propulsion unit such as a motor or engine. The equipment 9191 displays the signal output from the semiconductor apparatus 930 on the display apparatus 970 and performs external transmission by a communication apparatus (not shown) of the equipment 9191. For this purpose, the equipment 9191 may further include the storage apparatus 980 and the processing apparatus 960 in addition to the memory circuits and arithmetic circuits of the semiconductor apparatus 930. The mechanical apparatus 990 may be controlled based on the signal output from the semiconductor apparatus 930.

The equipment 9191 is suitable for an electronic equipment such as an information terminal (for example, a smartphone or a wearable terminal) having a shooting function, or a camera (for example, a lens interchangeable type camera, a compact camera, a video camera, or a surveillance camera). The mechanical apparatus 990 in the camera can drive the components of the optical apparatus 940 in order to perform zooming, an in-focus operation, and a shutter operation. Alternatively, the mechanical apparatus 990 in the camera can move the semiconductor apparatus 930 in order to perform an anti-vibration operation.

The equipment 9191 can also be a transportation equipment such as a vehicle, a ship, or a flying vehicle. The mechanical apparatus 990 in the transportation equipment can be used as a mobile apparatus. The equipment 9191 as the transportation equipment may transport the semiconductor apparatus 930, or assist and/or automate driving (steering) by a shooting function. The processing apparatus 960 for assisting and/or automating driving (steering) can perform processing for operating the mechanical apparatus 990 as a mobile apparatus based on the information obtained by the semiconductor apparatus 930. Alternatively, the equipment 9191 may be a medical equipment such as an endoscope or the like, a measurement equipment such as a range sensor or the like, an analysis equipment such as an electron microscope, an office equipment such as a copying machine or the like, or an industrial equipment such as a robot or the like.

According to the above-described embodiment, favorable pixel characteristics can be obtained. This can enhance the value of the semiconductor apparatus. The "value enhancement" corresponds to at least one of addition of a function, improvement of performance, improvement of characteristics, improvement of reliability, improvement of production yield, reduction of an environmental load, cost reduction, size reduction, and weight reduction.

The value of the equipment can also be improved by using the semiconductor apparatus 930 according to the embodiment in the equipment 9191. For example, the semiconductor apparatus 930 can be incorporated in a transportation equipment to obtain excellent performance when shooting the outside of the transportation equipment or measuring its external environment. In terms of production and sales of the transportation equipment, it is advantageous to high performance of the transportation equipment itself to determine incorporation of the semiconductor apparatus according to the embodiment into the transportation equipment. In particular, the semiconductor apparatus 930 can be used for a transportation equipment that uses information obtained by the semiconductor apparatus to perform driving support and/or automated driving of the transportation equipment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-129213, filed Aug. 5, 2021 which is hereby incorporated by reference herein in its entirety.

What is claimed is:

1. A photoelectric conversion apparatus comprising a driving unit and a plurality of pixels,
    each pixel including a first photoelectric conversion unit, a second photoelectric conversion unit, a charge-voltage conversion unit, a first transfer transistor provided between the first photoelectric conversion unit and the charge-voltage conversion unit, a second transfer transistor provided between the second photoelectric conversion unit and the charge-voltage conversion unit, a reset transistor provided between the charge-voltage conversion unit and a power supply voltage terminal, a microlens configured to condense incident light to the first photoelectric conversion unit and the second photoelectric conversion unit, and an output unit configured to output a signal corresponding to a voltage of the charge-voltage conversion unit,
    wherein the driving unit performs a first operation including a first reset operation of turning on the reset transistor, the first transfer transistor, and the second transfer transistor and then turning off the reset transistor, the first transfer transistor, and the second transfer transistor, and a first readout operation of, after the first reset operation, turning on the first transfer transistor and the second transfer transistor and outputting the signal corresponding to the voltage of the charge-voltage conversion unit from the output unit, and
    the driving unit performs a second operation including a second reset operation of turning on the reset transistor and the first transfer transistor and then turning off the reset transistor and the first transfer transistor, a third reset operation of turning on the reset transistor, the first transfer transistor, and the second transfer transistor and then turning off the reset transistor, the first transfer transistor, and the second transfer transistor, and a second readout operation of, after the third reset operation, turning on the first transfer transistor, outputting the signal corresponding to the voltage of the charge-voltage conversion unit from the output unit, turning on the first transfer transistor and the second transfer transistor in a state in which the charge-voltage conversion unit holds charges, and outputting the signal corresponding to the voltage of the charge-voltage conversion unit from the output unit.

2. The apparatus according to claim 1, wherein the driving unit is configured to supply a first reset potential to a control node of the reset transistor if turning on the reset transistor, and supply one of a second reset potential and a third reset potential to the control node of the reset transistor if turning off the reset transistor, and
    the first reset potential is higher than the second reset potential, and the third reset potential is lower than the second reset potential.

3. The apparatus according to claim 2, wherein if performing the first readout operation and the second readout operation, the driving unit supplies the third reset potential to the control node.

4. The apparatus according to claim 2, wherein the second reset potential is an intermediate potential between the first reset potential and the third reset potential.

5. The apparatus according to claim 3, wherein the second reset potential is an intermediate potential between the first reset potential and the third reset potential.

6. The apparatus according to claim 1, wherein the first operation and the second operation are repetitively performed in synchronization with a horizontal synchronizing signal.

7. The apparatus according to claim 2, wherein the first operation and the second operation are repetitively performed in synchronization with a horizontal synchronizing signal.

8. The apparatus according to claim 5, wherein the first operation and the second operation are repetitively performed in synchronization with a horizontal synchronizing signal.

9. The apparatus according to claim 6, wherein the first reset operation and the first readout operation are respectively performed during a period of one horizontal synchronizing signal, and the second reset operation, the third reset operation, and the second readout operation are respectively performed during a period of two horizontal synchronizing signals.

10. The apparatus according to claim 7, wherein the first reset operation and the first readout operation are respectively performed during a period of one horizontal synchronizing signal, and the second reset operation, the third reset operation, and the second readout operation are respectively performed during a period of two horizontal synchronizing signals.

11. The apparatus according to claim 8, wherein the first reset operation and the first readout operation are respectively performed during a period of one horizontal synchronizing signal, and the second reset operation, the third reset operation, and the second readout operation are respectively performed during a period of two horizontal synchronizing signals.

12. The apparatus according to claim 6, wherein a period until the first transfer transistor and the second transfer transistor are turned off in the third reset operation after the first transfer transistor and the second transfer transistor are turned off in the first reset operation is a period of four horizontal synchronizing signals.

13. The apparatus according to claim 9, wherein a period until the first transfer transistor and the second transfer transistor are turned off in the third reset operation after the first transfer transistor and the second transfer transistor are turned off in the first reset operation is a period of four horizontal synchronizing signals.

14. The apparatus according to claim 10, wherein a period until the first transfer transistor and the second transfer transistor are turned off in the third reset operation after the first transfer transistor and the second transfer transistor are turned off in the first reset operation is a period of four horizontal synchronizing signals.

15. The apparatus according to claim 11, wherein a period until the first transfer transistor and the second transfer transistor are turned off in the third reset operation after the first transfer transistor and the second transfer transistor are turned off in the first reset operation is a period of four horizontal synchronizing signals.

16. An image capturing apparatus comprising:
a photoelectric conversion apparatus defined in claim 1; and
a processing unit configured to process a signal from the photoelectric conversion apparatus.

17. An equipment including a photoelectric conversion apparatus defined in claim 1, comprising one of:
an optical apparatus corresponding to the photoelectric conversion apparatus;
a control apparatus configured to control the photoelectric conversion apparatus;
a processing apparatus configured to process a signal output from the photoelectric conversion apparatus;
a display apparatus configured to display information obtained by the photoelectric conversion apparatus;
a storage apparatus configured to store information obtained by the photoelectric conversion apparatus; and
a mechanical apparatus configured to operate based on information obtained by the photoelectric conversion apparatus.

18. A method of driving a photoelectric conversion apparatus including a driving unit and a plurality of pixels, each pixel including a first photoelectric conversion unit, a second photoelectric conversion unit, a charge-voltage conversion unit, a first transfer transistor provided between the first photoelectric conversion unit and the charge-voltage conversion unit, a second transfer transistor provided between the second photoelectric conversion unit and the charge-voltage conversion unit, a reset transistor provided between the charge-voltage conversion unit and a power supply voltage terminal, a microlens configured to condense incident light to the first photoelectric conversion unit and the second photoelectric conversion unit, and an output unit configured to output a signal corresponding to a voltage of the charge-voltage conversion unit, the method comprising:
a first driving method including causing the driving unit to turn on the reset transistor, the first transfer transistor, and the second transfer transistor and then turn off the reset transistor, the first transfer transistor, and the second transfer transistor, and to turn on the first transfer transistor and the second transfer transistor and output the signal corresponding to the voltage of the charge-voltage conversion unit from the output unit; and
a second driving method including causing the driving unit to turn on the reset transistor and the first transfer transistor and then turn off the reset transistor and the first transfer transistor, to turn on the reset transistor, the first transfer transistor, and the second transfer transistor and then turn off the reset transistor, the first transfer transistor, and the second transfer transistor, to turn on the first transfer transistor and output the signal corresponding to the voltage of the charge-voltage conversion unit from the output unit, and to turn on the first transfer transistor and the second transfer transistor in a state in which the charge-voltage conversion unit holds charges, and output the signal corresponding to the voltage of the charge-voltage conversion unit from the output unit.

* * * * *